United States Patent Office 2,993,365
Patented July 25, 1961

---

2,993,365
METHOD OF LEAK DETECTION
Vincent K. Van Allen, Bridgeport, and David L. Morgan, Shelton, Conn., assignors to Robertshaw-Fulton Controls Company, Richmond, Va., a corporation of Delaware
No Drawing. Filed Oct. 28, 1957, Ser. No. 692,522
3 Claims. (Cl. 73—45.5)

This invention relates to a method of leak detection. More particularly, it relates to a method of detecting leaks in an expansible hollow or partially hollow element or device which at room conditions has less than atmospheric pressure inside.

It is an object of this invention to provide a method of detecting leaks through apertures or like discontinuities extending through the walls of the element or device being tested, which method will be sensitive to minute leaks.

Another object of this invention is to provide a method of detecting leaks which is more convenient and quicker and, consequently, less expensive than the prior art methods.

It is a still further object of this invention to eliminate the use of an expensive apparatus and large quantities of testing liquid in detecting leaks.

In the preferred embodiment of this invention, the sealed device to be tested is immersed in a liquid having a relatively high vapor pressure. If there is a leak, the liquid will enter the sealed device. The sealed device is then removed from the liquid. The room conditions will cause vaporization of the liquid thereby producing an internal pressure which will cause expansion of the walls of the device.

The present invention is applicable to the testing of any conventional form of an evacuated hermetically sealed element or device. Accordingly, the device is immersed in a liquid having a relatively high vapor pressure, such as liquid nitrogen. The period of time of immersion is determined by the size of the aperture causing the leak which is desired to be detected. In other words, if only the detection of large leaks is desired, the device may be immersed for a relatively short period of time since the liquid will readily enter through the large apertures. On the other hand, the detection of smaller leaks requires a longer period of immersion since the liquid will not enter the sealed device as rapidly through the small apertures.

Since it may be desired to decrease the period of immersion, any suitable pressure producing means, such as a piston, could be applied to the liquid to increase the rate of leakage thereby rendering the required immersion period smaller. The pressure may be varied according to the size of the aperture causing the leak to be detected. It is readily apparent that the detection of an extremely minute leak will require subjecting the liquid to a high pressure.

The bath of liquid is for convenience although not necessarily a liquid that will vaporize at ordinary room temperature. While liquid nitrogen has been used, it should be understood that many liquids may be employed that will produce similar results.

When the desired immersion period has elapsed, the sealed device is removed from the liquid bath and allowed to warm to room temperature. Upon warming, the liquid nitrogen will vaporize and exert a pressure against the walls of the device tending to expand the same. Since the pressure inside the device was below atmospheric before immersion, the vapor will not leak out unless enough liquid has leaked in to cause a pressure above atmospheric. The expansion of the walls thereby reflects the amount of leakage of the sealed device.

It is apparent that without the use of an expensive apparatus or a large quantity of testing fluid this method will detect even the most minute leaks in the sealed device.

While the foregoing description discloses a preferred manner of applying and utilizing the present invention, it is to be understood that many changes may be made without departing from the scope of the invention as defined by the appended claims.

We claim:
1. The method of testing a sealed device having a reduced pressure therein by a substance which has the characteristic of being liquid in form at a substantially reduced temperature and vaporous in form at substantially room temperature comprising, immersing the device in said substance being liquid in form to allow leakage of the liquid through any aperture in said device, removing the device from said substance, exposing said device to absorb heat from room temperature ambient air to vaporize any liquid that has leaked into the device, and examining said device to detect an increase in the internal pressure of the device.

2. The method of testing an expansible hollow sealed device having a reduced pressure therein by a substance which has the characteristic of being liquid in form at a substantially reduced temperature and vaporous in form at substantially room temperature comprising, immersing the device in said substance being liquid in form to allow leakage of the liquid through any aperture in said device, removing the device from said substance, exposing said device to absorb heat from room temperature ambient air to vaporize any liquid that has leaked into the device, and measuring the outer physical dimensions of said device to detect any increase thereof to determine an increase in volume within said device caused by the presence of said substance in vapor form.

3. The method of testing an expansible hollow sealed device having a reduced pressure therein by a substance which has the characteristic of being liquid in form at a substantially reduced temperature and vaporous in form at substantially room temperature comprising, immersing the device in said substance being liquid in form, subjecting the liquid to an increased pressure to force the liquid through any aperture in the device, relieving the pressure from said liquid, removing the device from said substance in liquid form, exposing said device to absorb heat from room temperature ambient air to vaporize any liquid that has leaked into the device, and measuring the outer physical dimensions of said device to detect any increase thereof to determine an increase in volume within said device caused by the presence of said substance in vapor form.

References Cited in the file of this patent

UNITED STATES PATENTS

| | | |
|---|---|---|
| 1,590,736 | Clark | June 29, 1926 |
| 2,228,122 | Lowey | Jan. 7, 1941 |
| 2,391,354 | Slosberg | Dec. 18, 1945 |
| 2,727,383 | Rose | Dec. 20, 1955 |